United States Patent
Ancora et al.

(10) Patent No.: US 12,499,670 B2
(45) Date of Patent: Dec. 16, 2025

(54) DEVICE AND METHOD FOR DECISION SUPPORT OF AN ARTIFICIAL COGNITIVE SYSTEM

(71) Applicant: Renault S.A.S, Boulogne-Billancourt (FR)

(72) Inventors: Andrea Ancora, Golfe Juan (FR);
Matthieu Da-Silva-Filarder, Biot (FR);
Maxime Derome, Antony (FR);
Maurizio Filippone, Antibes (FR);
Pietro Michiardi, Mougins (FR)

(73) Assignee: AMPERE S.A.S., Boulogne-Billancourt (FR)

( * ) Notice: Subject to any disclaimer, the term of this patent is extended or adjusted under 35 U.S.C. 154(b) by 582 days.

(21) Appl. No.: 17/907,221

(22) PCT Filed: Mar. 8, 2021

(86) PCT No.: PCT/EP2021/055762
§ 371 (c)(1),
(2) Date: Feb. 16, 2023

(87) PCT Pub. No.: WO2021/190910
PCT Pub. Date: Sep. 30, 2021

(65) Prior Publication Data
US 2023/0306729 A1    Sep. 28, 2023

(30) Foreign Application Priority Data

Mar. 23, 2020 (FR) ...................................... 2002789

(51) Int. Cl.
*G06V 10/80* (2022.01)
*G06V 10/82* (2022.01)
*G06V 20/56* (2022.01)

(52) U.S. Cl.
CPC .............. *G06V 10/80* (2022.01); *G06V 10/82* (2022.01); *G06V 20/56* (2022.01); *G06V 2201/07* (2022.01)

(58) Field of Classification Search
CPC ........ G06V 10/80; G06V 10/82; G06V 20/56; G06V 2201/07
See application file for complete search history.

(56) References Cited

U.S. PATENT DOCUMENTS

| 2019/0080210 A1 | 3/2019 | Owechko |
| 2019/0135300 A1 * | 5/2019 | Gonzalez Aguirre . G06N 20/00 |

(Continued)

FOREIGN PATENT DOCUMENTS

| FR | 2 956 215 A1 | 8/2011 | |
| JP | 2007098979 A * | 4/2007 | ............... H04N 7/18 |
| KR | 102097742 B1 * | 4/2020 | ............... G06T 5/40 |

OTHER PUBLICATIONS

International Search Report Issued on Jun. 23, 2021, in PCT/EP2021/055762, filed on Mar. 8, 2021, 2 pages.

(Continued)

*Primary Examiner* — David F Dunphy
(74) *Attorney, Agent, or Firm* — Oblon, McClelland, Maier & Neustadt, L.L.P.

(57) ABSTRACT

A device for decision support of a cognitive system based on data originating from a plurality of data sources, the device including a processing unit associated with each data source, each processing unit including an encoding unit configured to determine, from the data from the data source associated with the processing unit, a representation of data in a common representation space by applying a machine learning algorithm to the data, the device further including a data fusion unit configured to determine a representation model of an environment of the cognitive system by combining the data representations determined by the encoding units asso- (Continued)

ciated with the plurality of data sources through the application of a data fusion algorithm.

8 Claims, 2 Drawing Sheets

(56) References Cited

U.S. PATENT DOCUMENTS

2020/0013154 A1    1/2020  Jang
2022/0270636 A1*   8/2022  Tao ..................... G06F 40/284

OTHER PUBLICATIONS

Preliminary French Search Report dated Apr. 3, 2020 in French Application No. 20222789, filed Mar. 23, 2020 3 pages, with Translation of Categories).

* cited by examiner

DEVICE AND METHOD FOR DECISION SUPPORT OF AN ARTIFICIAL COGNITIVE SYSTEM

The invention relates in general to artificial cognitive systems, and in particular to a decision assistance device and method for artificial cognitive systems.

The development of decision assistance systems has grown increasingly in recent years and has extended to numerous industrial sectors, such as the automotive industry and video surveillance (on land, on the railways, at sea and in the air).

With the development of artificial intelligence and cognitive science, advanced decision assistance systems, such as driving assistance systems for autonomous vehicles and connected vehicles, have emerged. Such systems implement cognitive processes for perceiving information, processing it, and making decisions by responding to the perceived information with one or more actions. Artificial systems capable of carrying out cognitive processes are called 'artificial cognitive systems'.

Artificial cognitive systems are equipped with sensors configured to capture physical quantities and collect information. The raw data collected by the various sensors may be fused before they are processed. The purpose of fusing data from multiple sensors or from multiple data sources is to combine these data such that the resulting information has less uncertainty than would be obtained when these data sources are used individually. Reducing uncertainty may mean obtaining more accurate, more complete or more reliable information, or may refer to the result of an emerging view, such as stereoscopic vision (for example computing depth information by combining two-dimensional images from two cameras with different points of view).

Fusing sensory data is essential for collecting information from any available sensor and reconstructing a reliable model that is as complete as possible of the surrounding environment in order to predict and apprehend the objects and the infrastructure forming said environment.

Reconstructing sensor data consists in transforming data from one sensor into a representation from another sensor. This problem is particularly complex in the case of heterogeneous or spatially and temporally misaligned sensors.

The problems of fusing and reconstructing sensor data are generally dealt with independently in the literature. Existing solutions for fusing sensor data and those relating to reconstructing the sensor data do not allow both problems to be solved jointly in the context of autonomous cognitive systems.

There is therefore a need to develop techniques for solving the problem of fusing and reconstructing sensor data for artificial cognitive systems, while at the same time increasing the efficiency of the precision and uncertainty of the reconstructed data and the information that is determined by combining data from various data sources.

General Definition of the Invention

To this end, the invention aims to provide a decision assistance device and method for a cognitive system based on data from a plurality of data sources.

More specifically, the invention provides a decision assistance device (10) for a cognitive system (1) based on data from a plurality of data sources (11-1, 11-2, 11-N), the device (10) comprising a processing unit (103-$i$) associated with each data source (11-$i$), each processing unit (103-$i$) comprising an encoding unit (1030-$i$) configured to determine, based on the data from the data source (11-$i$) associated with said processing unit (103-$i$), a data representation in a common representation space, the device (10) furthermore comprising a data fusion unit (105) configured to determine a representation model of an environment of the cognitive system (1) by combining the data representations determined by the encoding units (1030-$i$) associated with the plurality of data sources by applying a data fusion algorithm, each processing unit (103-$i$) associated with a data source (11-$i$) comprising a data reconstruction unit (1031-$i$) configured to determine, based on said representation model of the environment, a reconstructed data representation, the encoding unit (1030-$i$) contained in said processing unit (103-$i$) being configured to implement, during a training phase, a machine learning algorithm using training data, characterized in that at least one data reconstruction unit of a processing unit is configured to determine, based on said representation model of the environment, a reconstructed data representation associated with a missing data source associated with an encoding unit that is used during a preliminary training phase of training said device but inhibited during a usage phase of using said device.

Said at least one data reconstruction unit preferably uses an algorithm originating from machine learning using generative adversarial networks.

Said at least one data reconstruction unit corresponds to a virtual "bird's-eye view" sensor, said device receiving images from a rear-left camera and a rear-right camera of a vehicle. The inventors observed that a training phase with three cameras, one of which films the vehicle seen from above, was sufficient to allow a good-quality virtual sensor to be obtained.

The training data are, in some cases, data derived from the reconstructed data representation determined by said data reconstruction unit.

According to some embodiments, a data reconstruction unit may be configured to determine, based on the representation model of the environment, a reconstructed data representation associated with a missing data source.

According to some embodiments, a processing unit may comprise a comparison unit configured to compare the data from the data source associated with said processing unit with the reconstructed data representation determined by the data reconstruction unit associated with said data source.

According to some embodiments, the decision assistance device may comprise a decision unit configured to determine an action to be implemented by the cognitive system on the basis of the representation model of the environment and/or on the basis of said comparison.

According to some embodiments, the machine learning algorithm uses a neural network.

According to some embodiments, the neural network may be a sequential multi-channel auto-encoder.

According to some embodiments, the data fusion algorithm originates from a machine learning algorithm.

The invention furthermore provides a decision assistance method for a cognitive system based on data from a plurality of data sources, comprising the following steps:
  determining, based on the data from each data source, a data representation in a common representation space by applying a machine learning algorithm to said data, and
  determining a representation model of an environment of said cognitive system by combining the data representations determined in association with the plurality of data sources by applying a data fusion algorithm.

Advantageously, the embodiments of the invention make it possible to fuse data from a plurality of homogeneous or heterogeneous data sources, software data sources and their historical values.

Advantageously, the embodiments of the invention make it possible to reconstruct sensor data for autonomous artificial cognitive systems.

Advantageously, the embodiments of the invention make it possible, through the reconstruction of sensor data, to detect faults or anomalies with the sensors and to generate virtual sensor data based on existing sensors.

Advantageously, the embodiments of the invention offer increased reliability and precision by virtue of the combination of all the available information to reconstruct the data from an improved sensor.

Advantageously, the embodiments of the invention make it possible to transfer information (including sets of training data) between the various data sources.

Advantageously, the embodiments of the invention make it possible to convey data freely in both directions between the multiple representation spaces of the data sources and the common representation space of the model of the environment.

BRIEF DESCRIPTION OF THE DRAWINGS

Other features, details and advantages of the invention will become apparent on reading the description given with reference to the appended drawings, which are given by way of example and in which, respectively.

DETAILED DESCRIPTION

The embodiments of the invention provide a decision assistance device and method for a cognitive system based on data from a plurality of data sources.

The embodiments of the invention may be used in various applications implementing an artificial cognitive system or device, equipped with data sources and software and/or hardware means for processing information and executing one or more actions based on the captured and processed information. Exemplary applications comprise, without limitation, surveillance (for example video surveillance), navigation (for example road and maritime navigation), robotics and security.

Figure 1:
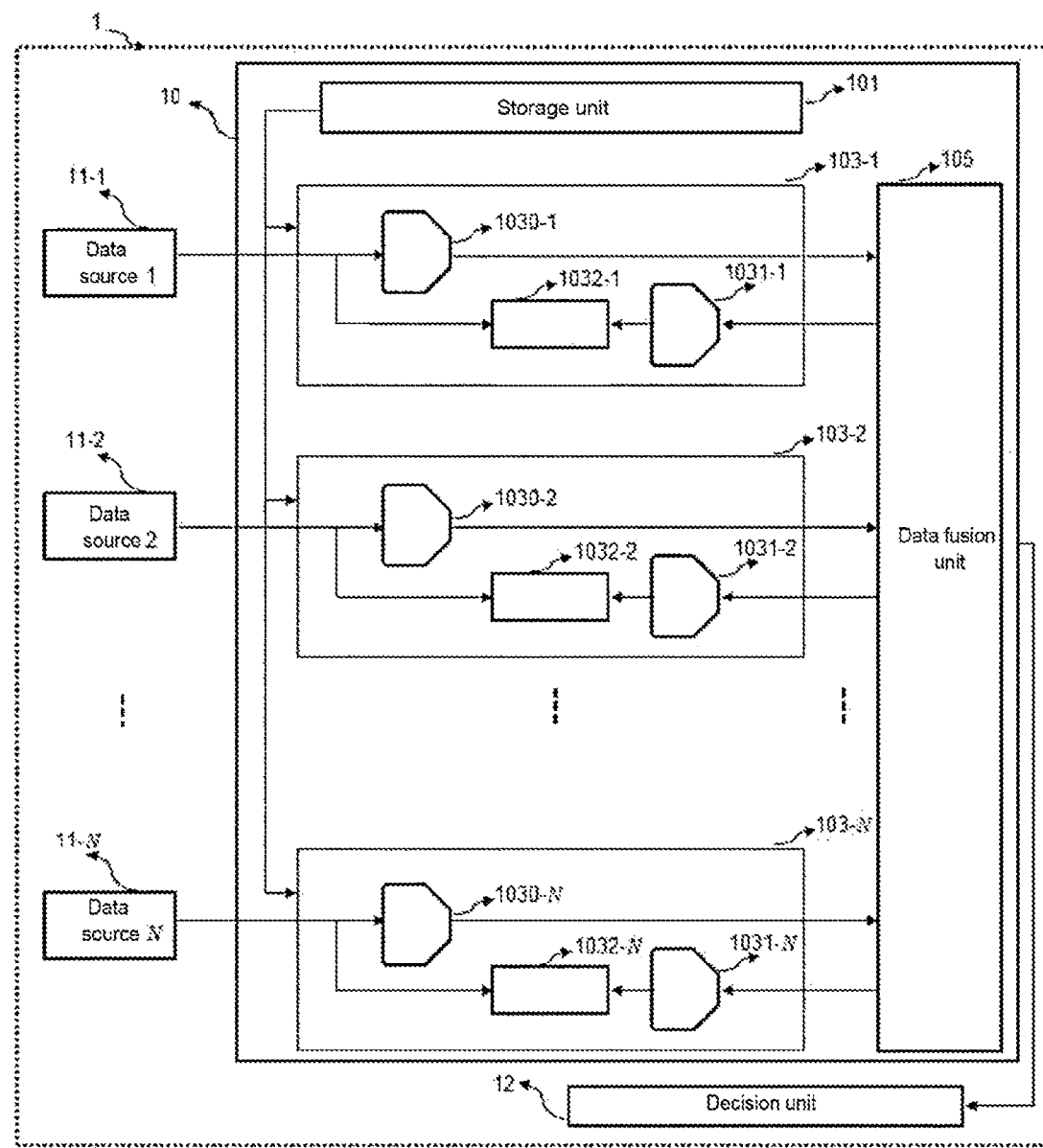
FIG. 1 is a diagram showing a decision assistance device 10 for a cognitive system 1, according to some embodiments of the invention.

FIG. 1 shows a cognitive system 1 in which a decision assistance device 10 and a decision assistance method according to the embodiments of the invention may be implemented.

The cognitive system 1 may be any type of system or machine or device comprising at least a plurality of N≥2 data sources designated 11-1 to 11-N that are configured to generate (raw or processed) data, a decision assistance device 10 configured to process the data from the plurality of data sources 11-1 to 11-N, and a decision unit 12 configured to determine at least one action to be implemented by the cognitive system 1 in response to the data received and processed by the decision assistance device 10.

By way of non-limiting example, the cognitive system 1 may form part of or may be a tracking system, a detection system, a surveillance system, a navigation system or an intelligent transport system.

A tracking system may be used in air traffic control systems for managing air traffic and preventing collisions between aircraft.

Applied to tracking systems, a data source 11-$i$, with i varying between 1 and N, may be a land, surface or aerial sensor, such as:

an air traffic control radar (for example a primary radar or a secondary radar);

a multilateration system (using for example long-range multilateration technology or else Wide Area Multilateration or WAM technology) consisting of multiple beacons that receive the signals transmitted by the transponder of an aircraft in order to locate it;

an ADS-C (acronym for 'Automatic Dependent Surveillance-Contract') system in which an aircraft uses its navigation systems to automatically determine and transmit its position to a handling center, or an ADS-B (acronym for 'Automatic Dependent Surveillance-Broadcast') system in which an aircraft uses its navigation systems to automatically determine and broadcast its position, along with other information such as speed and flight sign.

A detection system may be used by various control infrastructures (for example to detect submarines or objects placed on the seabed, in the field of fishing to detect schools of fish, in the field of mapping to map a geographical area, the bottom of oceans and other bodies of water, or else in the field of archaeology, for example sub-aquatic and underwater archaeology).

Applied to detection systems, a data source 11-$i$ may be a (passive or active) sonar. The data generated by the data source 11-$i$ may be raw data representing the acoustic waves reflected following various reflections in the environment of the detection system or may be processed data (for example after the application of a filtering, demodulation and sampling operation) represented in an image format (for example representations of the spatial coverage of a sonar).

A surveillance system may be a video surveillance system used for example in numerous civil and military applications such as maritime security, maritime navigation, environmental control, rescue operations, and maritime traffic surveillance.

Applied to surveillance systems, the cognitive system 1 may be implemented in an airborne surveillance system operating for example inside a surveillance aircraft. A data source 11-$i$ may be any type of image or video acquisition device configured to acquire image streams or video streams of the environment in which the cognitive system 1 evolves.

According to some embodiments, a data source 11-$i$ may be configured to acquire image streams or video streams in the visible light spectrum. The visible light spectrum comprises electromagnetic radiation visible to the human eye and having wavelengths between 400 and 700 nanometers. An image stream or video stream acquired in visible light consists of colors in the three RGB (red, green and blue) bands.

According to some embodiments, a data source 11-$i$ configured to acquire images or videos in visible light may be any visible light sensor designed to perform remote detection, any imaging spectrometry instrument configured to acquire spectrally resolved images of the environment of the cognitive system 1, or any RGB camera configured to record image streams or video streams in the visible light spectrum.

A navigation system may be used in any type of vehicle (for example automobiles, trucks, buses, motorcycles, agricultural machinery, trains, aircraft, ships) for road traffic management, rail traffic management, maritime traffic management, air traffic management, detecting speed limit breaches, and for recreational activities such as hiking or cycling.

Applied to navigation systems, a data source 11-$i$ may be for example an on-board position sensor, a (road, rail or air) radar, or a location or satellite positioning system (for example the global positioning system or GPS), configured to generate position data.

The embodiments of the invention may be used to provide driving assistance to a client vehicle operating and/or communicating in an intelligent transport system. The client vehicle may implement sensor technologies, processing and communication means and a human/machine interface to collect information from the intelligent transport system, process information received from its environment, and exchange information in real time with a remote server and/or with one or more vehicles connected into the intelligent transport system.

Applied to intelligent transport systems, the decision assistance device 10 and the decision assistance method according to the embodiments may be implemented in a cognitive system 1 that is implemented in a vehicle operating in an intelligent transport system. The vehicle may be automated or semi-automated, such as for example autonomous vehicles and connected vehicles. Exemplary driving assistance systems comprise ADAS (acronym for 'Advanced Driver-Assistance Systems') or AD (acronym for 'Autonomous Driving') systems.

Applied to intelligent transport systems, a data source 11-$i$ may be any type of on-board sensor or radar suitable for detecting vehicles, recognizing their license plates, detecting surrounding objects (for example road signs, obstacles), agents moving on the road (for example pedestrians, cyclists and other vehicles) and forward and/or backward perception and/or perception from the sides of the vehicle.

The data from the data sources 11-$i$ of a vehicle may comprise speed, position, direction, temperature, airbag status, precipitation, humidity, wind speed, ground content, data from collision avoidance cameras, data from parking radars, data from ultrasonic transceivers, and the license plate numbers of vehicles surrounding the vehicle in the intelligent transport system.

Applications of the cognitive system 1 to robotics comprise connected autonomous vehicles (Internet of vehicles and vehicle-to-vehicle or vehicle-to-infrastructure or vehicle-to-everything communications), home automation/smart homes, smart cities, wearable technology and connected health.

According to some embodiments, the cognitive system 1 may be a device chosen from a group comprising, without limitation, laptop computers, smartphones, tablets, and connected objects (for example medical devices, temperature and weather monitors, smart cards, smart meters, game consoles, personal digital assistants, health and fitness monitors, lamps, thermostats, garage doors, security devices, drones, smart clothes, e-health devices, and robots).

According to some embodiments, a data source 11-$i$ may correspond to a (fixed or mobile, digital or analog, embedded or remote) sensor, which may be any member or object or sensory device (for example a transducer) configured to measure physical characteristics such as temperature, humidity, acoustics, sound, vibrations, force/load/deformation/pressure, ambient light, and position/presence/accessibility.

According to some embodiments, a data source 11-$i$ may be a device configured to acquire an image stream or video stream.

According to some embodiments, a data source 11-$i$ may be configured to apply a processing operation to the acquired data before transmitting them to the decision assistance device 10.

According to some embodiments, a data source 11-$i$ may be chosen from a group comprising exteroceptive sources (such as cameras, lidars, radars, ultrasound sensors, etc.) and proprioceptive sources (such as odometers, inertial measurement units, position sensors, etc.).

According to some embodiments, the data sources 11-$i$, with $i$ varying from 1 to N, may comprise HD cards and/or distributed sensors not integrated into the cognitive system 1, the data from which may be made accessible to the cognitive system 1, and in particular to the decision assistance device 10, through communication channels such as V2X (acronym for 'Vehicle-to-everything') channels.

The data sources 11-$i$, with $i$ varying from 1 to N, may be homogeneous or heterogeneous. Homogeneous data sources 11-$i$ may be configured to have fully or partially overlapping spatial orientations so as to expand the field of view (for example stereovision cameras or multiple cameras mounted so as to cover the entire surrounding space).

According to some embodiments, a data source 11-$i$ may be a software sensor.

According to some embodiments, the data from the data sources 11-$i$, with $i$ varying between 1 and N, may comprise historical data acquired at past times or time intervals corresponding to measurements taken sequentially over time. The decision assistance device 10 may comprise a storage unit 101 configured to store these past data. The past data may correspond to any type of prior information resulting from a previous processing step (for example the result of a deterministic processing operation such as Kalman filtering of the positioning, the result of a previous step involving the extraction of specific characteristics of the raw data from the data sources, etc.) or low-rate contextual information (for example weather conditions).

According to some embodiments, the data from the data sources 11-$i$, with $i$ ranging from 1 to N, may form a continuous stream or a sequence (for example still images forming a video).

The data from the various data sources 11-$i$, for $i$ varying from 1 to N, may have different representations in different data representation spaces.

With reference to FIG. 1, the embodiments of the invention provide a decision assistance device 10 for a cognitive system 1 based on data from the plurality of data sources 11-$i$, with $i$ ranging from 1 to N, implementing machine learning techniques in order to fuse and reconstruct data from the data sources 11-$i$ for the purpose of providing the decision unit 12 with a data representation based on which the decision unit 12 is able to determine one or more actions to be implemented by the cognitive system 1.

The decision assistance device 10 may comprise a processing unit 103-$i$ associated with each data source 11-$i$, the processing unit 103-$i$ being configured to receive the data generated in real time by the corresponding data source 11-$i$ and to receive historical data previously stored in the storage unit 101. The processing unit 103-$i$ associated with the data source 11-$i$ may comprise an encoding unit 1030-$i$ configured to determine, based on the data from (in real time and/or historical data previously saved in the storage unit 101) the data source 11-$i$ associated with the processing unit 103-$i$, a data representation in a representation space common to the plurality of data sources 11-$i$, for i ranging from 1 to N, by applying a machine learning algorithm. The common representation space corresponds to a latent space common to all of the data sources 11-$i$, be these homogeneous or heterogeneous.

According to some embodiments, the machine learning algorithm implemented in an encoding unit 1030-$i$ may be an unsupervised machine learning algorithm chosen from a group comprising linear dimensionality reduction algorithms (for example principal component analysis), non-linear dimensionality reduction algorithms (for example auto-encoders), data partitioning algorithms (for example hierarchical partitioning algorithms and the 'Density-based Spatial Clustering of Applications with Noise' algorithm), and kernel methods (for example kernel clustering).

According to some embodiments, the machine learning algorithm implemented in an encoding unit 1030-$i$ may be an auto-encoder designed to determine a data representation in a common representation space of reduced dimension. An auto-encoder is an artificial neural network used for the unsupervised learning of a representation (or encoding) of a set of data for the purpose of reducing the dimension of this set. This may make it possible, inter alia, through dedicated training, to ignore signal noise, which is a second typical application for auto-encoders. The auto-encoder is used to learn how to reconstruct, based on the reduced encoding, a data representation that is as close as possible to the original data representation.

According to some embodiments, an auto-encoder may be chosen from a group comprising regularized auto-encoders, variational auto-encoders, convolutional auto-encoders and sequential auto-encoders. Sequential auto-encoders may be used to process data sequences and manage the structure of the temporal evolution of the data.

According to some embodiments, a sequential auto-encoder may be a sequential multi-channel auto-encoder.

According to some embodiments, the last layer of each auto-encoder implemented in each encoding unit 1030-$i$ may produce a mean and variance vectors characterizing a multivariate normal distribution of the same dimension for the set of encoding units 1030-$i$ associated with the plurality of data sources 11-$i$.

The encoding units 1030-$i$ associated with the various data sources 11-$i$, with i varying from 1 to N, independently process the data from the different data sources 11-$i$ (the data received in real time and/or the historical data previously stored in the storage unit 101) and generate data representations in a common representation space.

According to some embodiments, the decision assistance device 10 may furthermore comprise a data fusion unit 105 configured to receive and process the data representations generated by the various encoding units 1030-$i$ contained in the processing units 103-$i$ associated with the various data sources 11-$i$. More specifically, the data fusion unit 105 may be configured to determine a representation model of an environment of the cognitive system 1 by combining the data representations determined by the encoding units 1030-$i$ associated with the plurality of data sources 11-$i$ by applying a data fusion algorithm. The data fusion makes it possible to combine the data representations (also called codes) in order to determine an overall representation, also called a 'latent world model' or 'world model'.

According to some embodiments, the data fusion unit 105 may be configured to determine the latent world model using the data representations generated by the encoding units 1030-$i$ associated with the plurality of data sources and using data relating to at least one latent model that was determined at past times or time intervals.

According to some embodiments, the data fusion algorithm may be a deterministic algorithm such as, without limitation, the Kalman filter according to various variants. The Kalman filter is a recursive tool defined by a set of (linear or non-linear) equations for estimating the state of a system. In each iteration, the Kalman filter estimates data at the current time based on the data observed at the previous time corresponding to the previous iteration. A correction step follows the estimation step in order to correct the predicted data using the current data.

According to some embodiments, the data fusion algorithm may use the product of experts.

According to some embodiments, the data fusion algorithm may be a machine learning algorithm.

According to some embodiments, the data fusion algorithm may be a machine learning algorithm of recurrent neural network type. In particular, the data fusion algorithm may use LSTM (acronym for 'Long Short-Term Memory') networks.

It should be noted that the fusion algorithm with learning may be integrated into the encoder and into the decoder in order to jointly train the entire architecture. The fusion does not require all of the sensor data to be present; some of the data from each functional sensor is enough.

Advantageously, using a recurrent algorithm for the latent fusion in the latent space mentioned above makes it possible to synchronize and temporally align the data sources 11-$i$. Indeed, in the cognitive system, the data sources 11-$i$, for i ranging from 1 to N, may be unsynchronized, which means that the data from these sources may correspond to different measurement times, called timestamps. Since the data from the various data sources 11-$i$ have different timestamps, the data fusion unit 105 may be configured to take into account the timestamp of each datum in order to coherently determine the whole world model at a given time or time interval. The recursive step of recurrent neural networks makes it possible to efficiently perform such temporal alignment.

According to some embodiments, an uncertainty indicator may be associated with the data fusion algorithm in order to quantify the uncertainty of the outputs generated.

According to some embodiments, the representation model of the environment (or even the latent world model) may be used by the decision unit 12 to determine an action to be implemented by the cognitive system 1 and/or may be used for other tasks of the cognitive system 1 such as context understanding, trajectory planning or any other decision task.

According to some embodiments, the representation model of the environment determined by the data fusion unit 105 may be used for the data reconstruction. In these embodiments, the processing unit 103-$i$ associated with a data source 11-$i$, for i ranging from 1 to N, may comprise a data reconstruction unit 1031-$i$ configured to determine, based on the representation model of the environment determined by the data fusion unit 105, a reconstructed data representation in association with the data source 1031-$i$.

The reconstructed data representations associated with the data sources 1031-$i$ may be used in multiple ways.

According to some embodiments, the reconstructed data representations may be used to train the machine learning algorithm implemented in at least one encoding unit 1030-$i$. Thus, according to these embodiments, an encoding unit 1030-$i$ contained in a processing unit 103-$i$ may be configured to implement a training phase of training the machine learning algorithm using, as training data, data derived from the reconstructed data representation determined by the data reconstruction unit 1031-*i* associated with the data source 11-*i*. The data derived from the reconstructed representation may therefore be assimilated to raw data originating from a virtual sensor.

The data reconstruction according to the embodiments of the invention, by benefiting from the improved world model constructed from the contributions of all the data representations associated with the plurality of data sources, allows a refined reconstruction of the data sources, de-noising, restoration, and a general improvement in the quality of the data from the data sources 11-*i*. One example of this application is the case of sensor data corrupted by poor weather conditions such as rain or snow and the case of data obtained in poor lighting conditions. The de-noising capabilities of auto-encoders using spatial properties are improved by the use of various inputs by the combination of the sequential multi-channel auto-encoders and the usage of the temporal structure provided by the data fusion.

According to some embodiments, the reconstructed data representations may be used to detect faults with the data sources, to detect data corruption, and to monitor characteristics of the sensors and/or online calibration. For these embodiments, the reconstructed representations may be compared, for each data source 11-*i*, to the original input data from each data source.

According to these embodiments, a processing unit 103-*i* associated with the data source 11-*i*, for i varying from 1 to N, may furthermore comprise a comparison unit 1032-*i* configured to compare the data from the data source 11-*i* with the reconstructed data representation determined by the data reconstruction unit 1031-*i* associated with the data source 11-*i*.

The comparison makes it possible to detect random or systematic errors (for example, false alarms due to 'phantom' detections, which may be evidenced by comparing the data from the data source with the reconstructed data), to calibrate the data sources (for example detect a misalignment of the carrier of a sensor due to an impact or estimate a delay), and more generally, to detect whether a data source deviates from its nominal operating point by using the reconstructed data as a reference for the factory-calibrated non-corrupted nominal data).

According to some embodiments, the data reconstruction may be used to reconstruct a virtual data source, the decision assistance device 10 being configured to reconstruct the data of a missing data source. According to these embodiments, the decision assistance device 10 may have an asymmetrical configuration involving N processing units 103-*i*, among which the encoding unit 1030-*i* contained in a processing unit 103-*i* associated with the missing data source 11-*i*, with i varying between 1 and N, may be deactivated and the data reconstruction unit 1031-*i* may be configured to determine, based on the representation model of the environment, a reconstructed data representation associated with the missing data source.

Reconstructing virtual or missing data sources advantageously makes it possible to imitate high-quality sensors using multiple less expensive sensors (for example, images from cameras converted into lidar images), to ensure continuity of service in the event of a sensor being defective, below a given quality level or declared unreliable and the missing data stream being filled by the cooperation of all of the other data sources. For example, for a sensor that turns out to be defective, virtual sensor reconstruction makes it possible, by deactivating the corresponding encoding unit, to be able to reconstruct the data without adversely impacting the overall application of the cognitive system 1.

For example, for the learning phase of the neural network used by the fusion algorithm, three data sources 11-1 to 11-3 are used, these being cameras fixed respectively to the rear-right of an automobile, to the rear-left of the automobile, and on a drone filming a view from above of the automobile ("bird's-eye view") and its surroundings. The three cameras send three synchronous sequences of images to the corresponding auto-encoders 1030-1 to 1030-3, which are for example sequential auto-encoders. These auto-encoders send the data to the fusion algorithm, which uses cross-generation, that is to say the neural network uses a combination, which may be changeable, of the data or some of the data sent by the auto-encoders 1030-1 to 1030-3. This makes the fusion process very robust to losses of source data. Once the learning phase is complete, the device according to the invention is used without the data from the drone, but only with the rear-left and rear-right cameras of the vehicle. The device is nevertheless able to provide a precise top view of the vehicle and its environment. This therefore gives a virtual "bird's-eye view" sensor with a preliminary learning cycle while the vehicle is being driven with a drone.

In order to improve the quality of the images from the virtual sensor, it is possible to use generative adversarial networks such as discriminators to assist the data reconstruction units 1031-1 to 1031-3 in providing images of better fidelity. These generative adversarial networks are for example hybridized with variational generative auto-encoders.

The data reconstruction according to the embodiments of the invention furthermore makes it possible to transfer information between the data sources, by extending the set of training data for a data source by using the data from the other data sources. The data transfer also ignores the nature and the position of the data sources.

According to some embodiments, the decision unit 12 may be configured to determine an action to be implemented by the cognitive system 1 on the basis of the representation model of the environment and/or on the basis of the comparisons made between the original data from the data sources 11-*i* with the reconstructed data representations determined by the data reconstruction units 1031-*i*, for i ranging from 1 to N and/or on the basis of the reconstructed representations.

According to some embodiments, the decision assistance device 10 may be configured to dynamically adapt the configurations of the encoding units 1030-*i* and of the data reconstruction units 1031-*i* according to need by activating or deactivating the encoding and/or data reconstruction units. Adapting the hybrid configuration of the processing units advantageously makes it possible to minimize the processing power required.

The embodiments of the invention may be implemented using various means, for example using hardware, software or a combination thereof.

Advantageously, the decision assistance device 10 may be implemented by a low-bandwidth hardware architecture comprising secure interfaces that are agnostic to the data sources.

According to some embodiments where the encoding units 1030-*i* and the data sources 11-*i* form part of one and the same hardware platform separate from the one where the data fusion unit 105 is implemented, the communication bandwidth may be kept at a low level, the data being transported in the encoded format of the world model rather than in a raw data format requiring a large bandwidth (for example image pixel streams). This architecture also makes it possible to standardize the interfaces of the data sources 11-$i$ so that they are agnostic and generic with regard to the data sources 11-$i$.

According to some embodiments, the data reconstruction units 1031-$i$ may also be collocated with the data sources 11-$i$ and the encoding units 1030-$i$, for i ranging from 1 to N. A return channel for the a posteriori world model from the data fusion unit 105 to the processing unit of the data source 11-$i$ may be implemented. This architecture advantageously makes it possible to collocate the comparison units 1032-$i$ online, these being able to be configured to implement general tasks of monitoring the data sources 11-$i$, comprising for example dynamic activation/deactivation, calibration, timestamping, anomaly detection, and communication of the general state of the data source 11-$i$.

Advantageously, fusing the data representations in the latent space makes it possible to secure the hardware interfaces of the decision assistance device 10. Indeed, the representation of the latent space makes it possible to obscure the contents of the data from the point of view of an attacker, who is not able to interpret the latent space without any clue or form of supervision. The security level of the interfaces may be increased by using additional layers (for example time-dependent jamming or interleaving).

Figure 2:
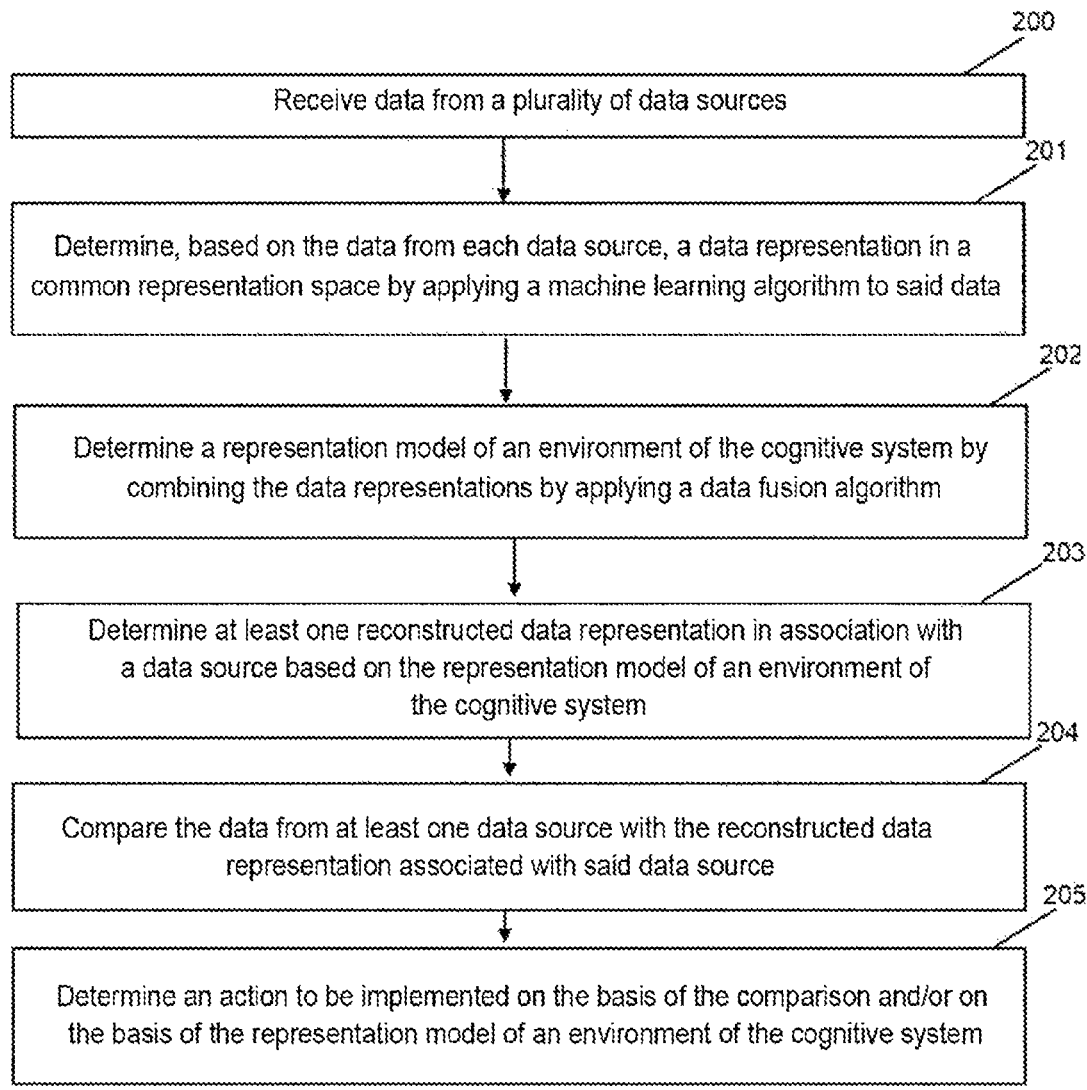
FIG. 2 is a flowchart showing a decision assistance method for a cognitive system, according to some embodiments of the invention.

With reference to FIG. 2, the embodiments of the invention furthermore provide a decision assistance method for a cognitive system 1 based on data from a plurality of data sources.

According to some embodiments, the data sources may be homogeneous or heterogeneous.

In step 200, data from a plurality of data sources may be received.

According to some embodiments, the data from the data sources may comprise historical data acquired at past times or time intervals corresponding to measurements taken sequentially over time.

According to some embodiments, the data from the data sources may form a continuous stream or a sequence and may have different representations in different data representation spaces.

According to some embodiments, the data from the data sources may comprise data generated in real time by the data sources, previously processed data, and/or contextual data.

In step 201, a data representation in a common representation space may be determined in association with each data source based on the data from the data source by applying a machine learning algorithm to said data. The representation space is common to the plurality of data sources.

According to some embodiments, the machine learning algorithm may be an unsupervised machine learning algorithm chosen from a group comprising linear dimensionality reduction algorithms (for example principal component analysis), non-linear dimensionality reduction algorithms (for example auto-encoders), data partitioning algorithms (for example hierarchical partitioning algorithms and the 'Density-based Spatial Clustering of Applications with Noise' algorithm), and kernel methods (for example kernel clustering).

According to some embodiments, the machine learning algorithm may be an auto-encoder designed to determine a data representation in a common representation space of reduced dimension.

According to some embodiments, an auto-encoder may be chosen from a group comprising regularized auto-encoders, variational auto-encoders, convolutional auto-encoders and sequential auto-encoders. Sequential auto-encoders may be used to process data sequences and manage the structure of the temporal evolution of data.

According to some embodiments, a sequential auto-encoder may be a sequential multi-channel auto-encoder.

In step 202, a representation model of an environment of the cognitive system 1 may be determined by combining the data representations determined in step 201 in association with the plurality of data sources by applying a data fusion algorithm.

According to some embodiments, the representation model of the environment may be determined in step 202 using the data representations generated in association with the plurality of data sources and using data relating to at least one latent model that was determined at past times or time intervals.

According to some embodiments, the data fusion algorithm may be a deterministic algorithm such as, without limitation, the Kalman filter according to various variants.

According to some embodiments, the data fusion algorithm may use the product of an expert.

According to some embodiments, the data fusion algorithm may be a machine learning algorithm.

According to some embodiments, the data fusion algorithm may be a machine learning algorithm of recurrent neural network type. In particular, the data fusion algorithm may use LSTM networks.

According to some embodiments, step 202 may comprise determining an uncertainty indicator in order to quantify the uncertainty of the outputs generated by the data fusion algorithm.

According to some embodiments, the representation model of the environment determined in step 202 may be used for the data reconstruction.

According to these embodiments, the method may comprise a step 203 of determining at least one reconstructed data representation in association with at least one data source based on the representation model of the environment of the cognitive system.

According to some embodiments, the method may furthermore comprise a step 204 of comparing the data from at least one data source with the reconstructed data representation determined in association with said data source.

According to some embodiments, the method may furthermore comprise a step 205 of determining an action to be implemented by the cognitive system on the basis of the comparison performed in step 204 and/or on the basis of the representation model of an environment of the cognitive system 1.

The invention is not limited to the embodiments described above by way of non-limiting example. It encompasses all variant embodiments that might be envisaged by those skilled in the art.

In general, the routines executed in order to implement the embodiments of the invention, whether implemented in the context of an operating system or of a specific application, of a component, of a program, of an object, of a module, or of a sequence of instructions, or even of a subset thereof, may be referred to as "computer program code" or simply "program code". Program code typically comprises computer-readable instructions that reside at various times in various memory and storage devices in a computer and that, when they are read and executed by one or more processors in a computer, cause the computer to perform the operations required to execute the operations and/or elements specific to the various aspects of the embodiments of the invention. The instructions of a program, which are computer-readable, for carrying out the operations of the embodiments of the invention may be, for example, the assembly language, or else a source code or an object code written in combination with one or more programming languages.

The invention claimed is:

1. A decision assistance device for a cognitive system based on data from a plurality of data sources, the device comprising:
    a respective processing circuit associated with each data source, each respective processing circuit comprising an encoder configured to determine, based on data from the corresponding data source associated with the respective processing circuit, a corresponding data representation in a common representation space; and
    data fusion circuitry configured to determine a representation model of an environment of the cognitive system by combining the data representations determined by the corresponding encoders associated with the plurality of data sources by applying a data fusion algorithm, wherein the data fusion algorithm is a recurrent neural network type of machine-learning algorithm that synchronizes and temporally aligns the data from the plurality of data sources,
    wherein each respective processing circuit associated with the corresponding data source is configured to determine, based on the determined representation model of the environment, the corresponding reconstructed data representation,
    each encoder is configured to implement, during a training phase, a machine learning algorithm using training data, and
    a particular processing circuit is further configured to determine, based on the determined representation model of the environment, a particular reconstructed data representation associated with a missing data source associated with a particular encoder that is used during a preliminary training phase of training said device, but inhibited during a usage phase of using said device.

2. The device as claimed in claim 1, wherein the particular processing circuit uses an algorithm originating from machine learning that uses generative adversarial networks.

3. The decision assistance device as claimed in claim 2, wherein each respective processing circuit is further configured to compare the data from the corresponding data source associated with said processing circuit with the corresponding reconstructed data representation determined by the respective processing circuit associated with the corresponding data source.

4. The decision assistance device as claimed in claim 3, further comprising decision circuitry configured to determine an action to be implemented by the cognitive system based on said representation model of the environment and/or on said comparison.

5. The device as claimed in claim 1, wherein the particular processing circuit corresponds to a virtual sensor, the decision assistance device receiving images from a rear-left camera and a rear-right camera of a vehicle.

6. The device as claimed in claim 1, wherein the training data are data derived from the corresponding reconstructed data representation determined by the respective processing circuit.

7. The decision assistance device as claimed in claim 1, wherein said machine learning algorithm is a neural network.

8. The decision assistance device as claimed in claim 7, wherein said neural network is a sequential multi-channel auto-encoder.

* * * * *